United States Patent [19]

Allison

[11] 4,447,738
[45] May 8, 1984

[54] WIND POWER ELECTRICAL GENERATOR SYSTEM

[76] Inventor: Johnny H. Allison, 43040 Penny, Sterling Heights, Mich. 48078

[21] Appl. No.: 335,983

[22] Filed: Dec. 30, 1981

[51] Int. Cl.³ .............................................. F03D 9/02
[52] U.S. Cl. ...................................... 290/44; 290/55; 60/398
[58] Field of Search ............... 290/44, 52, 55; 60/398, 60/698; 417/391

[56] References Cited

U.S. PATENT DOCUMENTS 3,806,733  4/1974  Haanen .............................. 290/44 X
4,206,608  6/1980  Bell .................................... 290/55 X
4,229,661  10/1980 Mead et al. ........................ 290/55 X
4,280,061  7/1981  Lawson-Tancred ................ 290/55
4,358,250  11/1982 Payne ................................ 60/398 X Primary Examiner—J. V. Truhe
Assistant Examiner—W. E. Duncanson, Jr.
Attorney, Agent, or Firm—Remy J. VanOphem

[57] ABSTRACT

A wind power electrical generator system having improved efficiency including a wind mill which activates an air compressor to generate a supply of pressurized air. An air motor activated by the supply of pressurized air drives a generator to produce electrical power. A waste air recovery mechanism, activated by the waste air from the air motor produces rotary energy assisting the wind mill in activating the air compressor.

17 Claims, 12 Drawing Figures

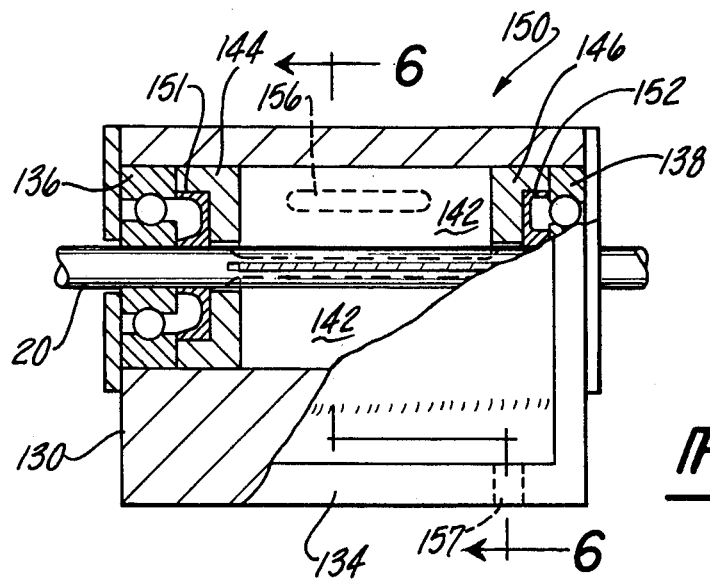
*Fig-5*
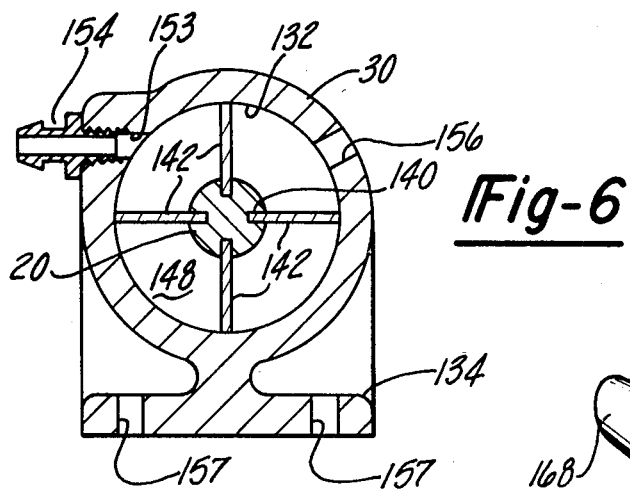
*Fig-6*
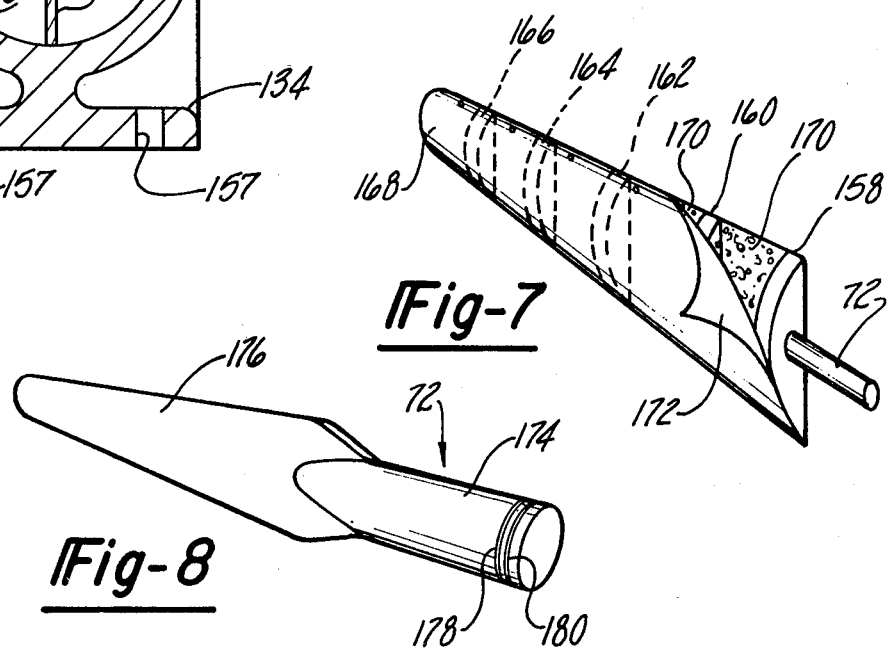
*Fig-7*
*Fig-8*

WIND POWER ELECTRICAL GENERATOR SYSTEM

BACKGROUND OF THE INVENTION

1. Field of the Invention

The invention relates to wind power electrical generator systems and in particular to a wind power electrical generator system in which the wind power is first converted to a pressurized source of air which is susbsequently converted to electrical power by an air motor connected to an electrical generator.

2. Prior Art

Wind power electrical generator systems in which the wind energy is converted to electrical energy through an intermediate storage step are known in the art. In particular, Harsen in U.S. Pat. No. 3,806,733, discloses a wind driven electrical energy conversion apparatus in which the wind energy is converted to a pressurized air supply which is susbsequently converted to rotary power by inflating air cells carried by an endless belt immersed in a tank filled with a fluid. The rotary output of the endless belt is connected to an electrical generator which produces the desired electrical power. Mead et al in U.S. Pat. No. 4,229,661, discloses a power plant for a camping trailer in which the wind energy is first converted to a pressurized air supply which is subsequently converted to a rotary output by an air driven turbine. The rotary output of the turbine is connected to a generator which produces the desired electrical power.

These systems are inefficient and do not utilize the total energy of the pressurized air supply. Disclosed herein is a wind powered electrical generator system in which the energy wasted in the conversion of the pressurized air supply to electrical power is partially recovered.

SUMMARY OF THE INVENTION

The wind power electrical generator includes a wind mill rotatably mounted on the top of a tower, an air compressor connected to the rotary output of the wind mill, an accumulator storing the pressurized air output of the air compressor to generate a supply of pressurized air, a first air motor receiving pressurized air from the accumulator to generate a rotary output, an electrical generator driven by the rotary output of the first air motor for generating the desired electrical power and a waste air recovery mechanism having a second air motor driven by the exhaust air of the first air motor producing a rotary output supplementing the wind energy driving the air compressor.

The primary advantage of the disclosed wind power electrial generator system is that it makes more efficient use of the energy of the pressurized air supply. Another advantage of the disclosed wind power electrical generator system is that the pressurized air supply may be used to power air driven tools. Still another advantage of the disclosed wind power electrical generator is that solar energy may be used to supplement the supply of pressurized air during periods when wind energy is incapable of sustaining the operation of the system.

These and other advantages of the disclosed wind power electrical generator system will become apparent from a reading of the detailed description of the invention in connection with the accompanying figures.

BRIEF DESCRIPTION OF THE DRAWINGS

FIG. 5 is a partially cutaway view of the waste air recovery mechanism;

FIG. 6 is an offset cross-sectional view of the waste air recovery mechanism taken along lines 6-6 of FIG. 5;

FIG. 7 is a cut away view showing the construction of one of the wind mill propellers of the present invention and;

FIG. 8 is a perspective view of a propeller shaft showing the details of its structure;

DESCRIPTION OF THE PREFERRED EMBODIMENT

Figure 1:
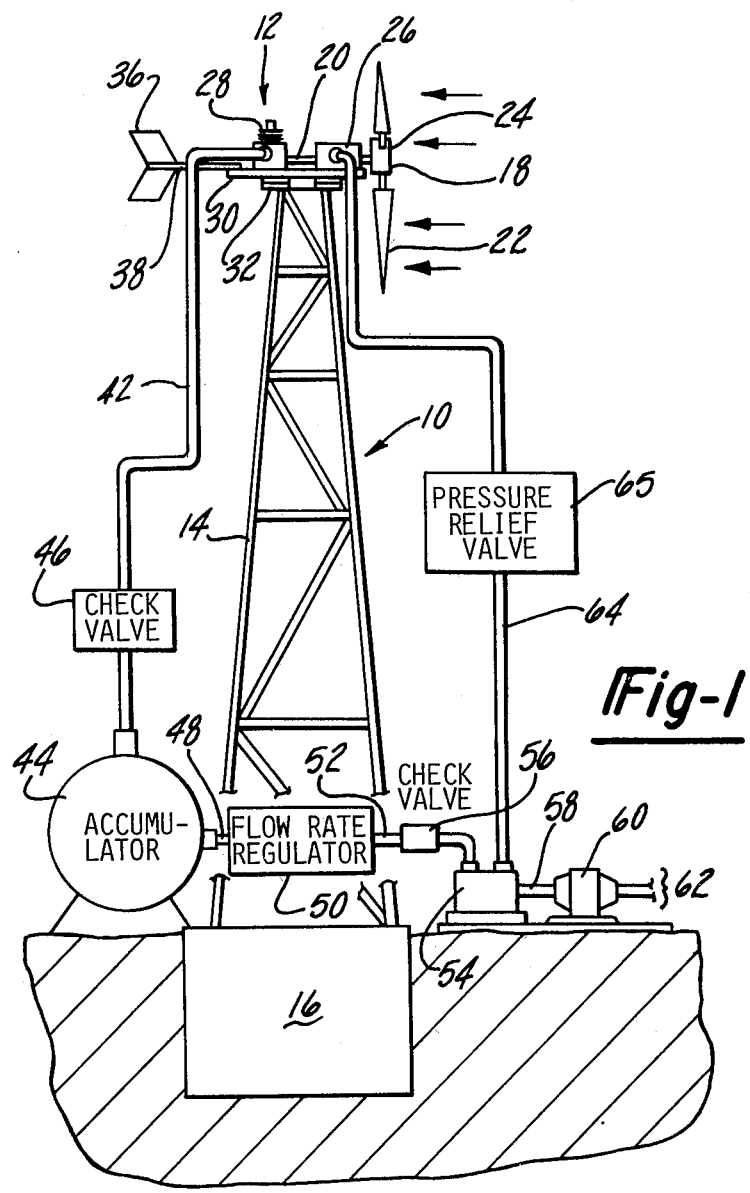
FIG. 1 is a drawing showing the structure of the wind power electrical generator system.

Referring to FIG. 1 there is shown the physical structure of the disclosed wind power electrical generator 10. The wind power electrical generator system includes an upper assembly 12 rotatably attached to the top of a support tower 14. The support tower 14 is rigidly mounted on a concrete base 16 buried in the ground.

The upper assembly 12 includes a wind mill assembly 18 mounted to one end of a shaft 20. The wind mill assembly 18 includes a plurality of propellers 22 connected to a hub assembly 24. The shaft 20 passes through a waste air recovery mechanism 26 which also serves to support the shaft 20 and the wind mill assembly 18 for rotation from a base plate 30. The opposite end of the shaft 20 is connected to an air compressor 28 also mounted on the base plate 30. The base plate 30 is rotatably attached to a circular plate 32 rigidly supported at the top of the tower 14.

A vertical vane 36 is fixedly attached to the base plate 30 by means of a pair of support struts 38. The vertical vane 36 keeps the base plate 30 and the wind mill assembly 18 pointed into the wind.

An air line 42 interconnects an output port of the air compressor 28 with an input port to an accumulator 44 through a check valve 46. An output air line 48 interconnects an output port of the accumulator 44 with an input to a flow rate regulator 50. An air line 52 interconnects the regulated output of the flow rate regulator 50 with an input to a first air motor 54 through a check valve 56. The first air motor 54 has a rotary output shaft 58 which drives an electrical generator 60. The electrical generator 60 generates electrical power on a pair of output leads 62 in response to the rotation of the shaft 58 by the first air motor 54.

An air line 64 interconnects an exhaust port of the first air motor 54 to an input port of the waste air recovery mechanism 26 through a pressure relief valve 65. The waste air recovery mechanism 26 has an exhaust port, not illustrated, exhausting the expended air to the atmosphere. The waste air recovery mechanism 26 includes a second air motor as shall be explained hereinafter with reference to FIGS. 5 and 6 which assists the wind mill assembly 18 in rotating the shaft 20 to drive the air compressor 28. Air lines 42 and 64 are pictorially illustrated external to the tower 14 to simplify the drawing. The air lines 42 and 64 respectively, are connected to the air compressor 28 and waste air recovery mechanism 26 respectively, through a rotary interconnect (not shown) attached to base the plate 30 and concentric with its axis of rotation about the circular plate 32 to accommodate rotation of the wind mill assembly 18 with respect to the tower 14.

The operation of the wind power generator is as follows: Wind energy rotates the wind mill 18 actuating the air compressor 28 to generate a supply of pressurized air stored in the accumulator 44. The check valve 46 prevents the pressurized air from back flowing through the air compressor during periods of light or low wind. A pressurized air flow from the accumulator 44 to the air motor 54 is regulated to a predetermined flow rate by flow rate regulator 50. The regulated air flow activates the air motor 54 to drive the electrical generator 60 at a predetermined speed to produce an alternating current at its output having the desired frequency. For common household use this frequency would be 60 Hertz, but may be any other desired frequency.

Only part of the energy of the air flow is expended in the air motor 54 to drive the electrical generator. The unused portion of this energy is exhausted from the air motor in the form of an air flow at a reduced pressure. The air flow exhausted from the air motor 54 is applied to the waste air recovery mechanism 26 which embodies a second air motor converting the unused energy into rotational energy of the shaft 20 supplementing the wind mill assembly 18 in driving the air compressor 28 thereby increasing the efficiency of the system. The pressure relief valve 65 prohibits an excessive back pressure from being built up at the exhaust port of the air motor 54 when the wind power is not sufficient for the wind mill assembly 18 to activate the air compressor 28.

As would be obvious to those skilled in the art, the pressurized air stored in the accumulator may also be used to power other devices such as an air wrench, a pneumatic jack, or similar mechanism.

Figure 3:
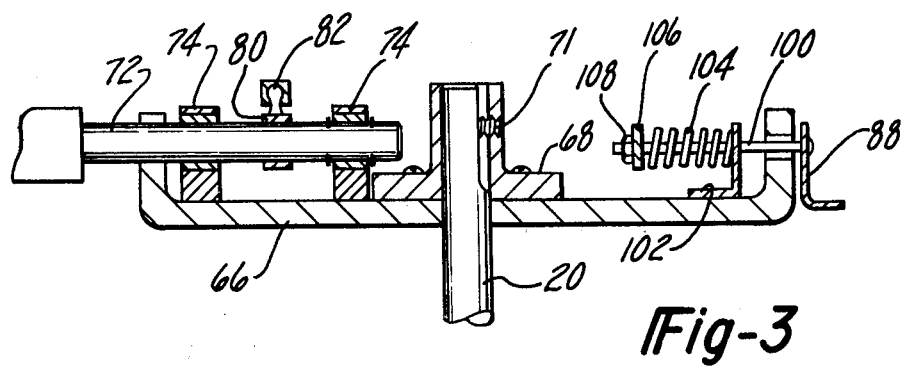
FIG. 3 is another sectional view of the hub taken along lines 3-3 of FIG. 2.
Figure 2:
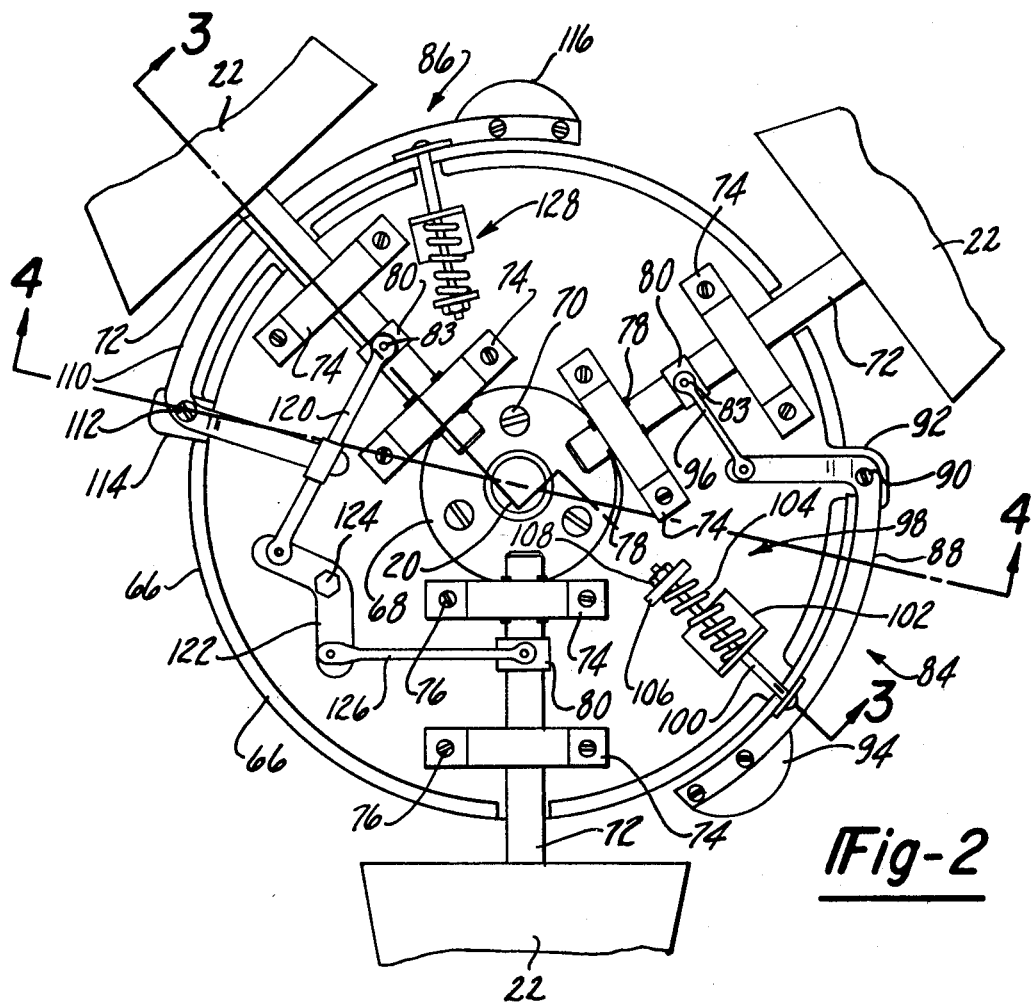
FIG. 2 is a plan view showing the details of the propeller hub.
Figure 4:
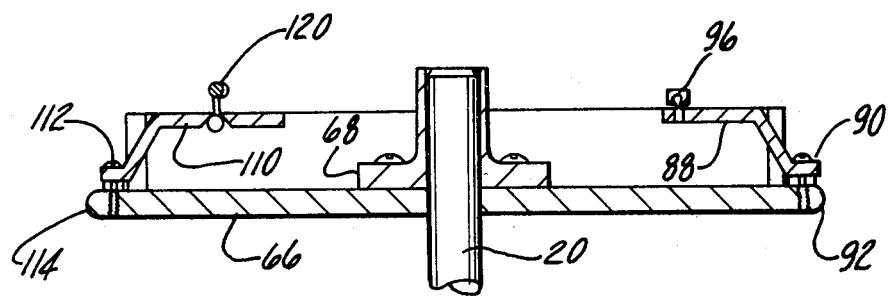
FIG. 4 is an offset sectional view, with parts removed, of the propeller hub taken along lines 4-4 of FIG. 2.

The details of the propeller's hub assembly 24 are shown in FIGS. 2, 3 and 4. Referring first to FIG. 2 there is shown a plan view of the hub assembly 24 with the cover plate (not shown) removed. The hub assembly 24 includes a cup shaped support member 66 having a hub 68 concentrically mounted thereto by means of fasteners, such as screws 70. The shaft 20 is secured to the hub 68 by means of a set screw 71 as shown in FIG. 3.

Each shaft 72 of the three propellers 22 are radially supported to rotate with respect to the support member 66 by means of a pair of spatially separated bushing blocks 74. Each bushing block 74 is attached to the support member 66 by a pair of screws, such as screws 76. Redial displacement of the propellers 22 is inhibited by a pair of "C" shaped retainer rings 78 disposed in peripheral grooves formed in each propeller shaft 72 either side of the inner most bushing block 74.

A collar 80, attached to each propeller shaft 72 intermediate the bushing blocks 74, supports a ball headed standard 83 which is mechanically linked by a link member 96 to a flyweight governors 84 and 86. The flyweight governor 84 includes a straight arm 82 and an angled arm 88 mounted for rotation about a pivot 90 attached to a mounting tab 92 extending radially from support the member 66. A weight 94 is attached to the end of the angled arm 88 external to the support member 66 while the straight arm 82 rotatably connects the internal end of the angled arm 88 with the link member 96 attached to one of the propeller shafts 72. The external end of angled arm 88 is radially biased towards the shaft 20 by a spring assembly 98 including a spring shaft 100 having one end connected to the external end of the angled arm 88 and the other end passing through an aperture in an "L" shaped mounting bracket 102 and, through a resilient member such as a spring 104. A spring retainer 106 is mounted on the other end of the spring shaft 100 and captivates the spring 104 between itself and the "L" shaped mounting bracket 102. A nut 108 is threadably received at the other end of the spring shaft 100 and provides for the adjustment of the position of the spring retainer 106 and the force biasing the external portion of the angled arm 88 radially towards the center of the hub assembly 24.

The flyweight governor 86 includes a second angled arm 110 mounted for rotation about a pivot 112 attached to a mounting tab 114 extending radially from the support member 66. A weight 116 is attached to the end of the angled arm 110 external to the support member 66 while a connecting arm 120 is pivotally connected at the other end. One end of the connecting arm 120 is connected to the ball headed standard 83 associated with one of the other two propeller shafts 72 while the other end of the connecting arm 120 is pivotally connected to one arm of a "V" lever 122. The "V" lever is rotatably supported from said support member 66 by means of a pivot member such as hex headed bolt 124. A connecting arm 126 pivotally interconnects the other arm of "V" lever 122 and the ball headed standard 83 associated with the third propeller shaft 72. A second spring assembly 128 similar to the spring assembly 98 resiliently biases the end of the angled arm 110 external to the support member 66 towards the center of the hub assembly 24.

The operation of the hub assembly 24 is as follows: Under light wind conditions, the spring assemblies 98 and 128 bias the external ends of the angled arms 88 and 110 towards the center of the hub assembly to the retracted positions shown in FIG. 2. In this position, the mechanical linkages connected between the internal ends of the angled arms 88 and 110 and the ball headed standards 83 associated with each propeller shaft 72, hold the propellers 22 at an angle predetermined to produce maximum efficiency of the wind mill assembly 18. When the rotational velocity of the wind mill assembly 18 exceeds a predetermined speed, the centrifugal force acting on the weights 94 and 116 produces a force on the external ends of the angled arms 88 and 110 exceeding the biasing forces of the spring assemblies 98 and 128, respectively. This causes the angled arms 88 and 110 to rotate about the respective pivots to an extended position. This rotation produces a corresponding mechanical displacement of the external ends of the angled arms 88 and 110 which is transferred to the ball headed standards 83 associated with each of the propeller shafts 72 by the mechanically linkages discussed above. The mechanical translation of the ball headed standards 83 normal to the axis of propeller shafts 72 causes them to rotate about their axis in the bushing blocks 74 in a direction tending to the "feather" the propellers 22 to a less efficient angle with respect to the wind. The weights 94 and 116, respectively, and the biasing forces of the spring assemblies 98 and 128 are selected so that the propeller blades 22 will be feathered in unison and their rotational velocity will not exceed a predetermined speed under high wind conditions.

The details of the waste air recovery mechanism 26 are shown in FIGS. 5 and 6. The waste air recovery mechanism 26 includes an impeller housing 130 having an internal cylindrical chamber 132 and a mounting flange 134. The shaft 20 passes axially through the cylindrical chamber 132 and is supported for rotation at the opposite ends of the cylindrical chamber 132 by a pair of roller bearings 136 and 138. The shaft 20 has four equally spaced slots or grooves 140 which hold four vanes 142 radially extending between the shaft 20 and the internal surface of the cylindrical chamber 132. A pair of cup shaped spacers 144 and 146 are disposed between the vanes 142 and the bearings 136 and 138 respectively and define a working chamber 148 of an air motor 150 including the shaft 20, the cylindrical chamber 132, and the spacers 144 and 146. Shaft seals 151 and 152, disposed inside the cup shaped spacers 144 and 146, respectively form an air tight seal about the shaft 20 at either end of the air motor's working chamber 148. The impeller housing 130 has a threaded air inlet port 153 for threadably receiving a hose fitting 154 or similar threaded connection, and an exhaust port 156. The mounting flange 134 has four bolt mounting holes, such as holes 157 for bolts securing the waste air recovery mechanism 26 to the base plate 30.

As previously stated, the waste air recovery mechanism 26 includes an air motor 150 and supports the shaft 20 and wind mill assembly 18 for rotation. Waste air from the air motor 54 driving the electrical generator 60 is received at the air inlet port 153. The waste air received at inlet port 153 generates a pressure differential across the vane 142 between the inlet port 153 and the exhaust port 156 which produces a rotational force on the shaft 20 assisting the wind mill assembly 18 in actuating the compressor 28.

The details of the propellers 22 are shown on FIGS. 7 through 10. Referring to FIGS. 7 and 8 each propeller comprises a propeller shaft 72, a series of ribs 158 through 166 fixedly attached to the propeller shaft 72, and a tip section 168. The spaces between the ribs 158 through the tip section 168 are filled with an expanded material 170 such as styrofoam or aluminum honeycomb for structural support and is covered with a thin layer of aluminum 172. Referring now to FIG. 8, the propeller shaft 72 has a circular section 174 at one end and a tapered blade section 176 for the remainder of its length. The end of the circular section 174 of the propeller shaft has a pair of circumferential grooves 178 and 180 for receiving the "C" shaped retaining rings 78 as described with reference to FIG. 2.

Figure 9:
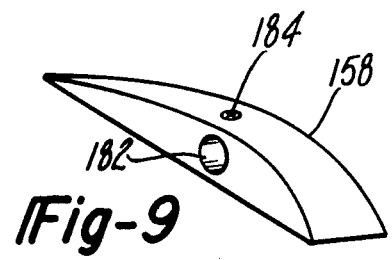
FIG. 9 is a perspective view of the first rib of the propeller.
Figure 10:
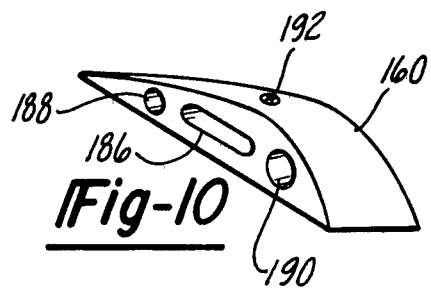
FIG. 10 is a perspective view of the intermediate ribs.

The details of the ribs 158 through 166 are shown on FIGS. 9 and 10. The first rib 158 shown in FIG. 9 is in the form of an air foil having a circular aperture 182 adapted to be received over the circular section 174 of the propeller shaft 72. A threaded aperture 184 receives a set screw (not shown) for fixedly attaching the rib 158 to the shaft 72.

The rib 160, shown on FIG. 10, is in the form of a corresponding air foil and has an oblong aperture 186 adapted to be received over the tapered blade section 176 of the propeller shaft 72. Apertures 188 and 190 may be added to reduce the weight of the rib. A threaded aperture 192 is provided to receive a set screw (not shown) for attaching the rib 160 to the propeller shaft 72. The remaining ribs 162 through 166 are basically the same as the rib 160 but are progressively smaller as they approach the tip of the propeller shaft 72. The oblong apertures 186 may be disposed at different angles with respect to the air foil to provide a twist to the propeller blade as is known in the art. The air foil configuration of the ribs 158 through 166 may be of any conventional shape and not limited to the air foil configuration shown.

Figure 11:
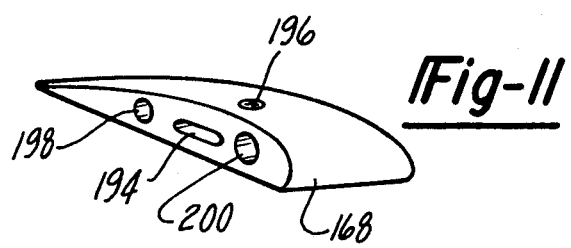
FIG. 11 is a perspective view of the propeller tip.

The tip section 168, shown in FIG. 11, has the same basic air foil configuration with an oblong aperture 194 adapted to be received over the end of the tapered blade section 176 of the propeller shaft 72 and a threaded aperture 196 for receiving a set screw (not shown) attaching the tip section 168 to the propeller shaft 72. Holes 198 and 200 may be added to reduce the weight of the tip section 168. The tip section 168, as well as ribs 158 through 166, may be made from any lightweight structural material such as aluminum, wood or a lightweight structural plastic.

Figure 12:
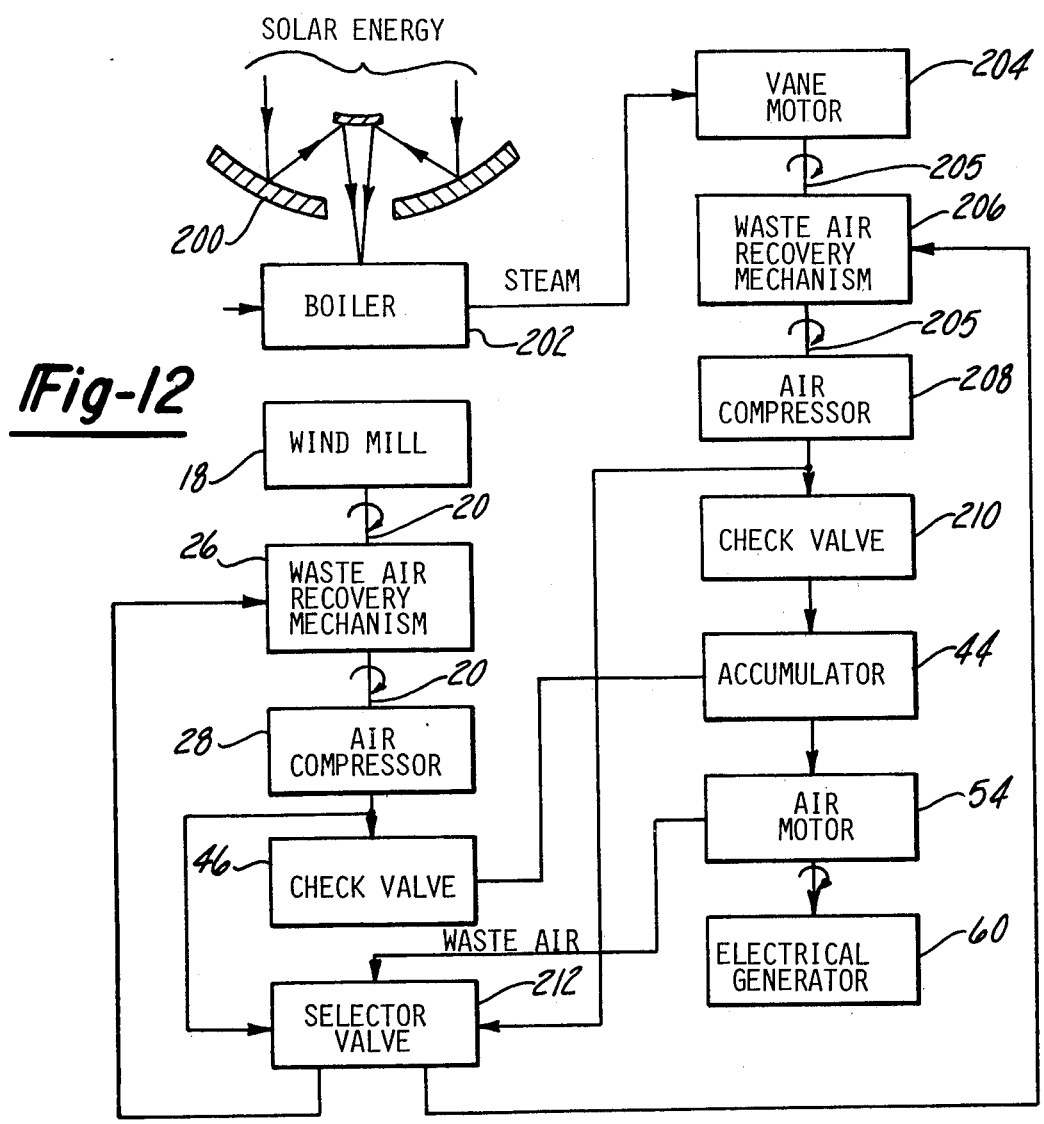
FIG. 12 is a block diagram of the wind driven electrical generator supplemented by solar energy.

The wind power electrical generator may be supplemented by a solar energy converter as illustrated on FIG. 12. As previously described, the wind mill assembly 18 generates a rotary motion on the shaft 20 which passes through the waste air recovery mechanism 26 and activates the air compressor 28. The compressed air generated by the air compressor 28 passes through a check valve 46 and is stored in an accumulator 44. The compressed air stored in the accumulator 44 activates an air motor 54 which produces a rotary motion turning the electrical generator 60. The waste air from air motor 54 passes through a selector valve 212 back to the waste air recovery mechanism 26 where it assists the wind mill assembly in activating the air compressor 28. The operation and function of the selector valve 212 shall be explained hereinafter.

Additionally the system includes a solar energy to steam conversion apparatus such as a parabolic mirror 200 which collects solar energy which is transmitted to a boiler 202 which produces steam in response to the collected solar energy. The steam from the boiler 202 activates a vane motor 204 to produce a rotary motion on a shaft 205 which activates an air compressor 208 through a waste air recovery mechanism 206. The waste air recovery mechanism 206 and the air compressor 208 are functionally the same as the waste air recovery mechanism 26 and the air compressor 28 discussed with reference to FIG. 1 and structurally may include identical elements. The compressed air from the air compressor 208 passes through a check valve 210 to the accumulator 44 where it is stored.

The check valves 46 and 210 isolate their respective air compressors from the pressure in the accumulator 44 and only permit an air flow to the accumulator 44 when their associated air pump is providing air at a pressure greater than the pressure in the accumulator 44.

The selector valve 212 is controlled by the output pressure being generated by both the air compressors 28 and 208 and transmits the waste air from the air motor 54 back to the waste air recovery mechanism whose air compressor is generating air at the highest pressure thereby assisting the air pump which is supplying air to the accumulator 44. Thus it is seen that the accumulator 44 is capable of being supplied with pressurized air from either wind or solar energy.

One skilled in the art will recognize that other solar to rotary energy converters may be substituted for the parabolic mirror 200, boiler 202, and vane motor 204 without departing from the spirit of the present invention.

What is claimed is:

1. A wind power electrical generator system comprising:
    means for converting wind energy into rotational energy of an output shaft;
    first air compressor means driven by said output shaft for generating a supply of compressed air;
    accumulator means connected to said first air compressor means for storing said compressed air;
    electrical generator means for generating electrical power in response to a rotary input;
    first air motor means having an input port and an exhaust port, for generating said rotary input to said electrical generator in response to a flow of pressurized air received at said input port from said accumulator means; and
    first waste air recovery means connected to said exhaust port of said first air motor means for converting the waste air flow exhausted by said first air motor means into a rotational energy supplementing said means for converting wind energy in driving said first air compressor means.

2. The electrical generator system of claim 1 wherein said means for converting wind energy is a wind mill rotating said output shaft in response to wind energy.

3. The electrical generator system of claim 2 further including:
    a tower having a base end and an elevated end;
    a support base rotatably attached to the elevated end of said tower, said support base fixedly supporting said wind mill, said first air compressor means, and said waste air recovery means; and
    a vane vertically supported from said support base opposite said wind mill for rotating said support base and said windmill into the wind in response to wind energy.

4. The electrical generator system of claim 2 wherein said wind mill comprises:
    hub assembly means attached to said output shaft; and
    a plurality of propellers attached to said hub assembly means for converting said wind energy into said rotational energy.

5. The electrical generator system of claim 4 wherein hub assembly means includes governor means responsive to the rotational velocity of said hub assembly means to change the angular orientation of said plurality of propellers and change the conversion efficiency of said wind mill.

6. The electrical generator system of claim 5 wherein said governor means changes the angular orientation of said plurality of propellers to limit the rotational velocity of said wind mill to a predetermined maximum speed.

7. The electrical generator system of claims 4 or 5 wherein said plurality of propellers comprises at least three propellers.

8. The electrical generator system of claims 4 or 5 wherein said governor means comprises at least two flyweights mechanically linked to said plurality of propellers as a function of the rotational velocity of said hub assembly means.

9. The electrical generator system of claim 3 wherein said waste air recovery means comprises:
    means for supporting said output shaft for rotation from said support base; and
    second air motor means attached to said output shaft for producing rotational energy in response to the waste air flow exhausted from said exhaust port of said first air motor.

10. The electrical generator system of claim 1 wherein said waste air recovery means comprises:
    a housing having a cylindrical chamber, an entrance port for receiving the waste air flow exhausted from said first air motor and an exhaust port angularly displaced from said input port;
    a pair of bearings disposed at opposite ends of said cylindrical chamber for axially supporting said output shaft for rotation in said housing;
    a plurality of vanes radially attached to said output shaft intermediate said pair of bearings, said vanes radially extending between said output shaft and the internal surface of said cylindrical chamber;
    a pair of spacers, one of said spacers disposed between each of said bearings and the opposite ends of said vanes;
    wherein said output shaft, said cylindrical chamber, said plurality of vanes and said spacers comprise an air motor imparting rotational energy to said output shaft in response to the waste air flow received at said input port.

11. The electrical generator system of claim 1 further including:
    means for converting solar energy to steam;
    means for converting said steam into a rotary motion;
    second air compressor means driven in response to said rotary motion to generate a supply of pressurized air communicated to and stored in said accumulator means;
    second waste air recovery means for converting the waste air flow exhausted by said first air motor into rotational energy assisting said means for converting said steam in driving said second air compressor means; and
    selector valve means disposed between the exhaust port of said first air motor means and said first and second waste air recovery means, said selector valve means responsive to pressure of the pressurized air being generated by said first and second air compressor means for transmitting the waste air flow to said waste air recovery means associated with the air compressor means generating pressurized air at the highest pressure.

12. The electrical generator system of claim 11 wherein said means for converting solar energy comprises:
    means for collecting solar energy; and
    a boiler responsive to said collected solar energy for generating steam.

13. The electrical generator system of claim 4 wherein each of said plurality of propellers comprises:

a propeller shaft having a circular section at one end and a tapered blade section extending forwards at the opposite end;

a first rib having an external air foil configuration and a circular aperture received over said circular section of said propeller shaft and secured thereto at a predetermined distance from said one the end of said propeller shaft;

a propeller tip having an external air foil configuration and an oblong aperture received over the end of said tapered blade section and secured thereto; tion and an oblong aperture received over said opposite end of said tapered blade section and secured thereto;

a plurality of second ribs having an external air foil configuration and an oblong aperture received over said tapered blade section of said propeller shaft, said second ribs secured along said tapered blade section at predetermined intervals between said first rib and said propeller tip;

expanded material filling the spaces between said first and second ribs and said propeller tip; and a cover enclosing said first and second ribs and said expanded material between said first rib and said propeller tip.

14. The electrical generator system of claim 13 wherein said first and second ribs are made from aluminum and said expanded material is styrofoam.

15. A method for generating electrical power from wind energy comprising the steps of:

converting wind energy to a rotational motion with a wind mill;

activating an air compressor with said rotational motion to generate a supply of pressurized air;

driving an air motor from said supply of pressurized air to generate a rotary output and supply of waste air;

activating an electrical generator with said rotary output of said air motor to produce electrical power; and converting said supply of waste air exhausted from said air motor to rotational energy assisting said wind mill in activating said air compressor.

16. The method of claim 15 wherein said step of activating an air compressor to generate a supply of pressurized air includes the step of storing said pressurized air in an accumulator to provide a continuous flow of pressurized air during periods of low wind energy.

17. The method of claim 16 further comprising the steps of:

converting solar energy into a supply of steam under pressure;

activating a steam motor with said steam to generate a rotary motion;

driving an air compressor with said rotary motion to generate a supply of pressurized air; and storing said pressurized air in said accumulator to provide pressurized air activating said air motor in response to solar energy.

* * * * *

UNITED STATES PATENT AND TRADEMARK OFFICE
CERTIFICATE OF CORRECTION

PATENT NO. : 4,447,738

DATED : May 8, 1984

INVENTOR(S) : John H. Allison

It is certified that error appears in the above-identified patent and that said Letters Patent is hereby corrected as shown below:

Column 1, line 26, after "et al" insert a comma ---- , ----.

Column 1, line 51, after "power" insert a comma ---- , ----.

Column 3, line 10, after the numeral "64" insert a comma ---- , ----.

Column 3, line 13, delete "base the" and insert ---- the base ----.

Column 3, line 25, after "by" insert ---- the ----.

Column 3, line 65, delete "Redial" and insert ---- Radial ----.

Column 4, line 4, delete "a".

Column 4, line 8, delete "support the" and insert ---- the support ----.

Column 4, line 23, delete "the" second occurrence.

Column 5, line 4, after "72" insert a comma ---- , ----.

UNITED STATES PATENT AND TRADEMARK OFFICE
CERTIFICATE OF CORRECTION

PATENT NO. : 4,447,738

DATED : May 8, 1984

INVENTOR(S) : John H. Allison

It is certified that error appears in the above-identified patent and that said Letters Patent is hereby corrected as shown below:

Column 5, line 5, delete "the" first occurrence.

Column 5, line 9, delete "propeller blades" should read -- propellers --.

Column 5, line 25, after "138" insert a --- , ---.

Column 5, line 26, after "respectively" insert a --- , ---.

Column 5, line 30, after "respectively" insert a --- , ---.

Column 6, line 40, after "from" should read -- the --.

Column 9, line 10, delete "the" and insert -- said opposite --.

Column 9, lines 12, 13 and 14 delete entirely.

Figure 2 should appear as shown on the attached sheet.

Signed and Sealed this

Sixteenth Day of April 1985

[SEAL]

Attest:

DONALD J. QUIGG

*Attesting Officer*     *Acting Commissioner of Patents and Trademarks*

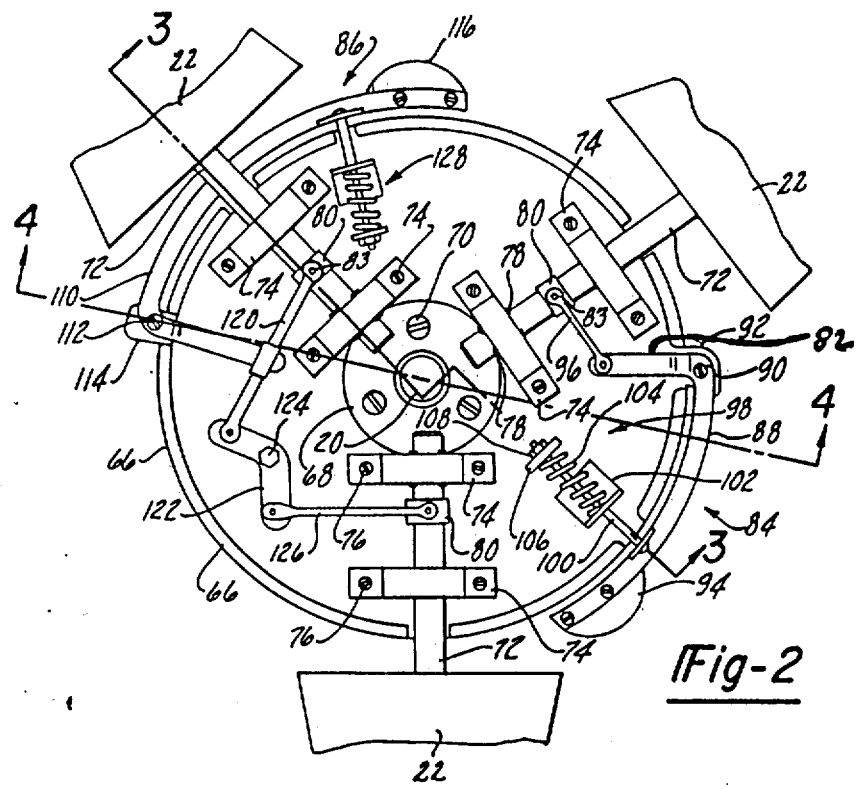

UNITED STATES PATENT AND TRADEMARK OFFICE
CERTIFICATE OF CORRECTION

PATENT NO. : 4,447,738

DATED : May 8, 1984

INVENTOR(S) : John H. Allison

It is certified that error appears in the above-identified patent and that said Letters Patent is hereby corrected as shown below:

Column 8, line 7, after "propellers" insert -- for producing a mechanical motion rotating said plurality of propellers --.

Signed and Sealed this

Twenty-first Day of May 1985

[SEAL]

Attest:

DONALD J. QUIGG

Attesting Officer

Acting Commissioner of Patents and Trademarks